United States Patent [19]

Landhuis

[11] Patent Number: 5,249,419
[45] Date of Patent: Oct. 5, 1993

[54] NOZZLE LINER FOR GAS TURBINE ENGINES

[75] Inventor: Kevin Landhuis, Rockford, Ill.

[73] Assignee: The United States of America as represented by the Secretary of the Air Force, Washington, D.C.

[21] Appl. No.: 957,923

[22] Filed: Oct. 7, 1992

[51] Int. Cl.$^5$ ............................................. F02K 3/10
[52] U.S. Cl. ............................... 60/261; 239/127.3
[58] Field of Search ............... 60/261, 266, 271, 754, 60/755, 757; 239/265.11, 265.17, 265.23, 590.3, 553.3, 127.1, 127.3

[56] References Cited

U.S. PATENT DOCUMENTS

| | | | |
|---|---|---|---|
| 3,127,737 | 4/1964 | Ledwith | 60/266 |
| 4,071,194 | 1/1978 | Eckert et al. | 239/127.3 |

Primary Examiner—Richard A. Bertsch
Assistant Examiner—William Wicker
Attorney, Agent, or Firm—Stanton E. Collier; Donald J. Singer

[57] ABSTRACT

The improved liner comprises a base plate that mounts to the wall of the nozzle, at least one inner tube having a plurality of leg supports thereon for mounting to the base plate, a cylindrical seal attached to the bottom of the inner tube, and an outer tube loosely mounted about the inner tube and seal with the leg supports extending therethrough. The outer tube is not fixedly attached to the inner tube or seal or leg supports and thus can move in response to pressure and temperature changes. Both the inner and outer tubes have holes therein to allow for the flow of cooling air from the inner tube to the outer tube to the hot area of gas flow.

3 Claims, 2 Drawing Sheets

NOZZLE LINER FOR GAS TURBINE ENGINES

STATEMENT OF GOVERNMENT INTEREST

The invention described herein may be manufactured and used by or for the Government for governmental purposes without the payment of any royalty thereon.

BACKGROUND OF THE INVENTION

The present invention relates to gas turbine engines, and, in particular, relates to nozzles of gas turbine engines, and, more particularly, relates to the liners used in gas turbine engines.

It is well known in the jet engine art that extreme temperatures can develop in an exhaust nozzle, for example, during afterburner operation which can cause failure by burning through the nozzle wall. Various liner devices for the nozzles have been developed to treat this problem but difficulties in the manufacture and/or operation exist.

For example, one prior liner device placed a plurality of perforated panels in the nozzle. The panels are held and positioned away from the nozzle wall by means of hinged supports thus creating a cooling air plenum between the nozzle wall and the panels. Under extreme temperature operating conditions, cooling air is forced into the plenum and out of the perforated holes in the panels thus lowering the temperatures at the walls. The panels themselves move on the hinged supports in response to changes in pressure and temperature. This movement creates numerous problems because the various openings, non-cooling, must be sealed as best possible; otherwise, hot spots can develop on the nozzle wall. This particular liner device is more suitable to 2-D nozzles having flat walls; otherwise, the placement in a curved nozzle is difficult to accomplish.

Thus, there exists a need for an improved liner for a gas turbine nozzle that eliminates or substantially reduces sealing problems, panel movement problems, mounting problems on curved surfaces and can be easily attached to the substructure.

SUMMARY OF THE INVENTION

The present invention of an improved liner of a gas turbine engine comprises a base plate that mounts to the wall of the nozzle, at least one inner tube having a plurality of leg supports thereon for mounting to the base plate, a cylindrical seal that is attached to the bottom of the inner tube and moves against an outer tube, and the outer tube loosely mounts about the inner tube. Both the inner and outer tubes have holes therein to allow for the flow of cooling air from the inner tube to the outer tube to the hot area of gas flow above the outer tubes. The outer tubes have a plurality of leg support openings therein that fit loosely about the legs of the inner tube which allows the outer tube to move in response to pressure and temperature changes without creating any sealing problems.

Therefore, one object of the present invention is to provide an improved liner for a nozzle of a gas turbine engine.

Another object of the present invention is to provide an improved liner having a thermally free outer surface.

Another object of the present invention is to provide a structure free of sealing problems between the components carrying cooling air and the wall of the nozzle.

Another object of the present invention is to provide a simplified means of routing cooling air and the pressure thereof.

Another object of the present invention is to provide a means to prevent blow off pressure loads.

Another object of the present invention is to provide a means of easily attaching the improved liner to the nozzle wall whether curved or flat.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
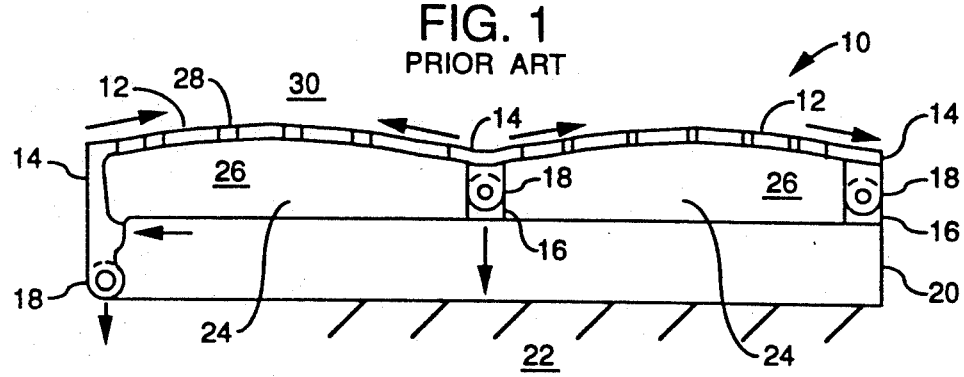
FIG. 1 illustrates by side view a prior art liner for a nozzle.

Referring to FIG. 1, a prior art liner 10 is shown partially by a cross section. As seen therein, a plurality of perforated panels 12 are attached to upper supports 14. The upper supports 14 are attached to lower supports 16 by means of hinges 18. The lower supports 16 are attached to a liner substructure 20 which is attached to a nozzle wall 22. In operation, cooling air 24 is input into the plenums 26 in a desired manner and flows out of the holes 28 in the panels 12 into a hot gas stream 30. The panels 12 can obviously move in response to differential pressures thereon and temperature changes thereon. The various moving parts thus have numerous openings to allow such and thus hot gases may pass therein. If there is any interconnection between the plenums 26, an over pressure in one area may cause a blow off pressure to occur in another section of the liner 10.

Figure 2:
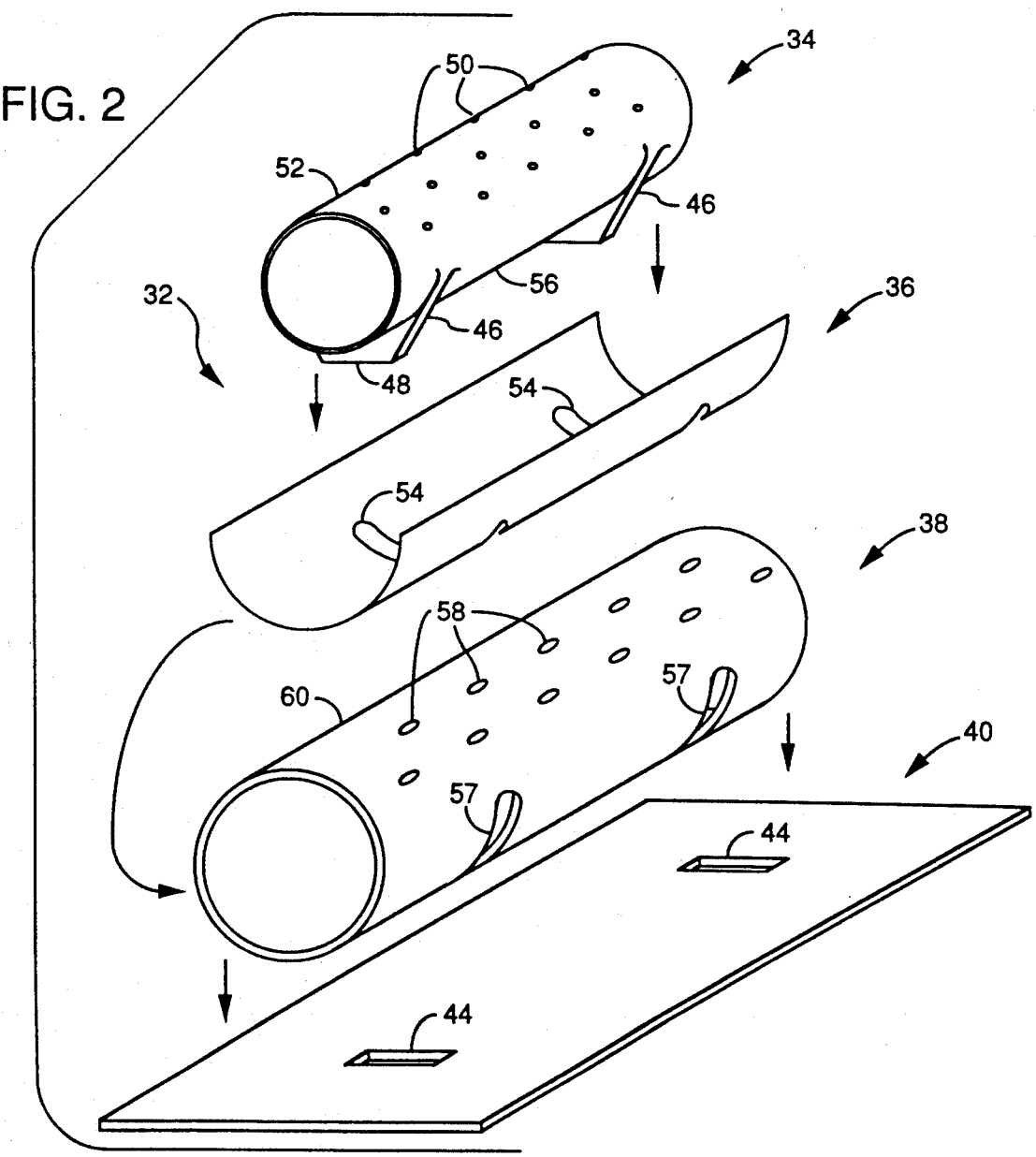
FIG. 2 illustrates by exploded view the various items of the present invention.

Referring to FIG. 2, a partially shown improved liner section 32 is shown in exploded view. As seen therein, the improved liner section 32 comprises an inner tube 34, a seal 36, an outer tube 38, and a base plate 40.

Figure 3:
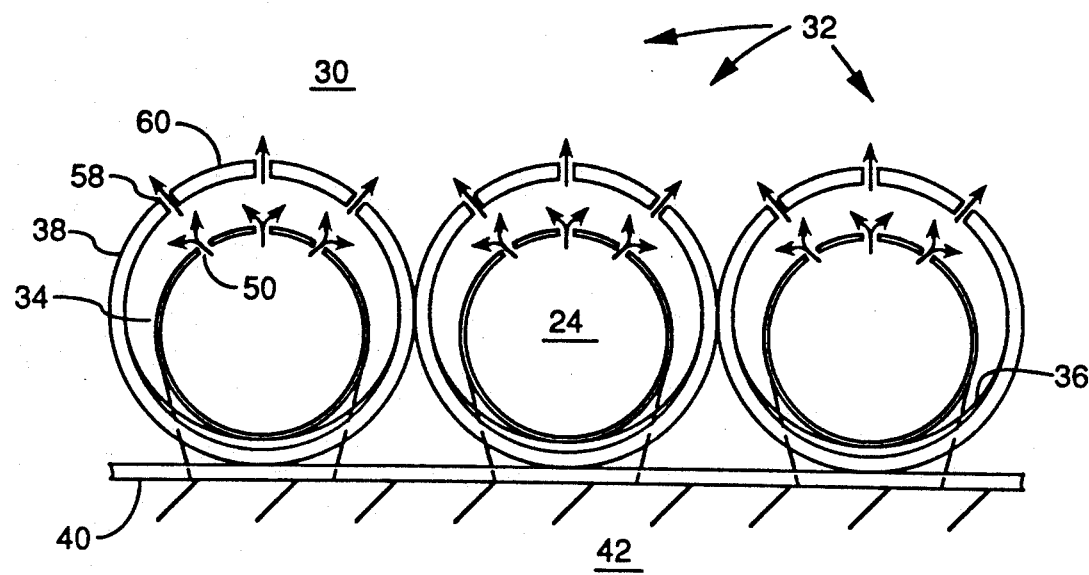
FIG. 3 illustrates by end cross section the improved liner of the present invention.

FIG. 3 illustrates by end view a cross section a plurality of the liner sections 32 assembled and mounted in a parallel manner to a base structure 42 which may be a nozzle wall.

Referring back to FIG. 2, the base plate 40 can be attached by conventional means to the nozzle wall whether flat or curved. The base plate 40 has a plurality of leg openings 44 for receiving leg supports 46 of the inner tube 34. The lower ends 48 of the leg supports 46 are fixedly attached by brazing, for example, into the leg openings 44 of the base plate 40.

The inner tube 34, the seal 36, the outer tube 38 and base plate 40 can all be bent to conform to almost any nozzle wall configuration without any loss in performance.

The inner tube 34 has a plurality of impingement air cooling holes 50 on its upper surface 52 opposite to the leg supports 46.

Figure 4:
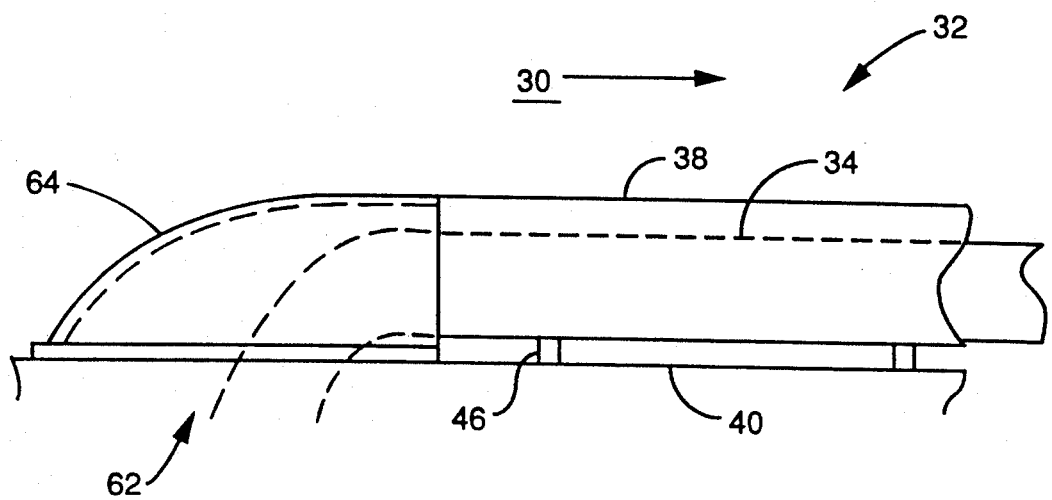
FIG. 4 illustrates a means of connecting the improved liner of the present invention into an air manifold with an aerodynamic curved surface thereto.

The seal 36 being essentially one half of a cylinder has a plurality of leg support openings 54 therein. The seal 36 is placed onto the bottom 56 of the inner tube 34 and attached to the leg supports 46 so no air can flow therebetween and through the leg support openings 54. The seal 36 is made of flexible metal which under air pressure moves. As seen in FIG. 4, the seal 36 rests on the inside of the outer tube 38 at the bottom thereof. Thus when air pressure increases inside of the outer tube 38, the seal 36 is pushed against the inside of the outer tube 38 but the outer tube 38 is still about to move.

Once the seal 36 is attached to the inner tube 34, this assembled item is placed inside of the outer tube 38 where the leg supports 46 extend out of the outer tube leg opening 57. The leg supports 46 fit loosely within the leg openings 57 to allow the outer tube 38 to move as a result of pressure and/or temperature changes. The leg support lower ends 48 are then fixedly attached in the openings 44 of the base plate 40 by brazing, for example. The outer tube 38 has a plurality of film cooling holes 58 on a top surface 60 thereof. Once assembled, the improved liner sections 32 are placed on the nozzle wall and connected to the air manifold 62 as seen in FIG. 4. The upper stream end of the improved liner section 32 may be loosely connected into an aerodynamically shaped front cover 64. Further, one or more leg supports 46 may be hollow for the purpose of inputting cooling air into the inner tube 34.

Referring to FIG. 3, the cooling air 24 flows into the inner tubes 34 and out of the impingement cooling holes 50 onto the outer tube 38 and then out of the film cooling holes 58 to prevent heat buildup on the outer tube top surface 60. The film cooling holes may be arranged in size, shape, output angle, density thereon, etc., to prevent the hot gases 30 from flowing onto the base plate 40. The outer tubes 38 may not touch so as to be free to move.

As seen from the above, the outer tubes 38 are thermally free to move and present no sealing problems. The inner tube 34 can easily be made of sufficient metal thickness to carry an internal air pressure. Also, because of attachment and shape, any blow off pressure created is of no problem. Although this improved liner has been shown in gas turbine engines, clearly, other uses are possible where there is fluctuating heat and pressure loads and the walls must be kept cool.

Although the inner tube 34 and the outer tube 38 are shown as cylindrical, other shapes are possible such as oval.

Clearly, many modifications and variations of the present invention are possible in light of the above teachings and it is therefore understood, that within the inventive scope of the inventive concept, the invention may be practiced otherwise than specifically claimed.

What is claimed is:

1. An improved liner, said improved liner comprising:
    a plurality of inner tubes, said inner tubes having a plurality of leg supports and a plurality of impingement air cooling holes on a top surface of said inner tubes;
    a plurality of seals, said seals having a plurality of leg support openings therein, said seals being fixedly attached to the leg supports of said inner tubes to prevent air flow past said leg supports, said seals being in contact with a bottom of said inner tubes;
    a plurality of outer tubes, said outer tubes having a plurality of film cooling holes in a top surface and a plurality of leg openings in a bottom thereof, said leg supports of said inner tube loosely fitting within said leg openings of said outer tube; and
    at least one base plate, said base plate having a plurality of leg openings therein, said leg supports of said inner tubes being fixedly attached into said leg openings of said base plate.

2. An improved liner as defined in claim 1 wherein said seal is a cylindrically shaped half tube made of a flexible metal.

3. An improved liner as defined in claim 1 wherein said base plate, said inner tube, said seal and said outer tube are bent to fit on a curved surface.

* * * * *